US012699077B2

(12) United States Patent
Tate et al.

(10) Patent No.: US 12,699,077 B2
(45) Date of Patent: Aug. 4, 2026

(54) AUTOMATED MODELING OF LC PEAK SHAPE

(71) Applicant: DH TECHNOLOGIES DEVELOPMENT PTE. LTD., Singapore (SG)

(72) Inventors: Stephen A. Tate, Barrie (CA); Lyle Lorrence Burton, Woodbridge (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 706 days.

(21) Appl. No.: 18/247,796

(22) PCT Filed: Oct. 6, 2021

(86) PCT No.: PCT/IB2021/059169
§ 371 (c)(1),
(2) Date: Apr. 4, 2023

(87) PCT Pub. No.: WO2022/074583
PCT Pub. Date: Apr. 14, 2022

(65) Prior Publication Data
US 2023/0366863 A1 Nov. 16, 2023

Related U.S. Application Data

(60) Provisional application No. 63/088,387, filed on Oct. 6, 2020.

(51) Int. Cl.
*G01N 30/86* (2006.01)
*G01N 30/72* (2006.01)

(52) U.S. Cl.
CPC ..... *G01N 30/8679* (2013.01); *G01N 30/8631* (2013.01); *G01N 30/72* (2013.01); *G01N 30/8655* (2013.01)

(58) Field of Classification Search
CPC ........... G01N 30/8679; G01N 30/8631; G01N 30/72; G01N 30/8655; G01N 30/8606; G01N 30/8637; H01J 49/004
(Continued)

(56) References Cited

U.S. PATENT DOCUMENTS

| | | |
|---|---|---|
| 8,515,684 B2 | 8/2013 | Boyer et al. |
| 10,732,156 B2 | 8/2020 | Ivosev |
| 2016/0025691 A1 | 1/2016 | Taneda |

OTHER PUBLICATIONS

Cao, et al ("Predicting retention time in hydrophilic interaction liquid chromatography mass spectrometry and its use for peak annotation in metabolomics" Metabolomics (2015) 11:696-70) (Year: 2015).*

(Continued)

*Primary Examiner* — Michael Maskell
(74) *Attorney, Agent, or Firm* — Lathrop GPM LLP; Malaika O.D. Tyson; Jason Kuchar

(57) ABSTRACT

A compound is separated or introduced from a sample at a plurality of different times. The compound is ionized, producing an ion beam. The compound is selected and mass analyzed or the compound is selected, fragmented, and fragments of the compound are analyzed from the ion beam at the plurality of different times, producing a plurality of mass spectra. An XIC is calculated for the compound using the plurality of mass spectra. A chemical structure of the compound received in notation form is converted to a numerical vector using a processing algorithm operable to convert the notation form to the numerical vector. A plurality of peak shape parameters is calculated for the compound using the numerical vector and a machine trained model. A peak of the XIC is identified as a peak of the compound using the plurality of peak shape parameters and optionally a peak integration algorithm.

19 Claims, 5 Drawing Sheets

(58) Field of Classification Search
USPC .................................................. 250/281, 282
See application file for complete search history.

(56)                     References Cited

OTHER PUBLICATIONS

International Search Report and Written Opinion for PCT/IB2021/059169, mailed Dec. 20, 2021.
Cao Mingshu et al.: "Predicting Retention Time in Hydrophilic Interaction Liquid Chromatography Mass Spectrometry and Its Use for Peak Annotation in Metabolomics," Matabolomics, Springer US, New York, vol. 11, No. 3, Sep. 7, 2014, pp. 696-706, XP035497787.
Hakime Ozturk et al.: "A Novel Methodology on Distributed Representations of Proteins using Their Interacting Ligands," Arxiv. Org, Cornell University Library, 201 Olin Library Cornell University Ithaca, NY 14853, Jan. 30, 2018, XP081211304.

* cited by examiner

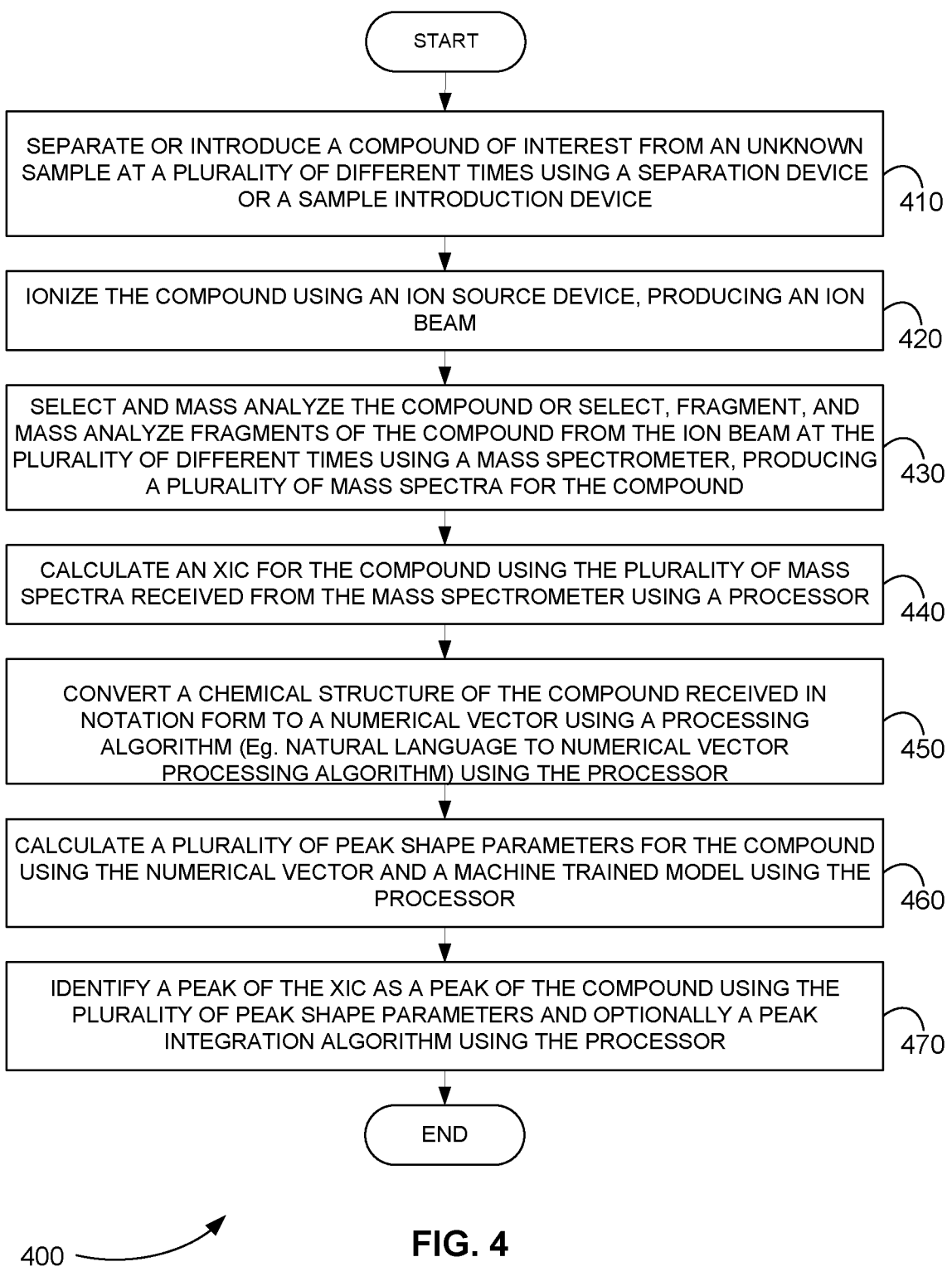

START

SEPARATE OR INTRODUCE A COMPOUND OF INTEREST FROM AN UNKNOWN SAMPLE AT A PLURALITY OF DIFFERENT TIMES USING A SEPARATION DEVICE OR A SAMPLE INTRODUCTION DEVICE — 410

IONIZE THE COMPOUND USING AN ION SOURCE DEVICE, PRODUCING AN ION BEAM — 420

SELECT AND MASS ANALYZE THE COMPOUND OR SELECT, FRAGMENT, AND MASS ANALYZE FRAGMENTS OF THE COMPOUND FROM THE ION BEAM AT THE PLURALITY OF DIFFERENT TIMES USING A MASS SPECTROMETER, PRODUCING A PLURALITY OF MASS SPECTRA FOR THE COMPOUND — 430

CALCULATE AN XIC FOR THE COMPOUND USING THE PLURALITY OF MASS SPECTRA RECEIVED FROM THE MASS SPECTROMETER USING A PROCESSOR — 440

CONVERT A CHEMICAL STRUCTURE OF THE COMPOUND RECEIVED IN NOTATION FORM TO A NUMERICAL VECTOR USING A PROCESSING ALGORITHM (Eg. NATURAL LANGUAGE TO NUMERICAL VECTOR PROCESSING ALGORITHM) USING THE PROCESSOR — 450

CALCULATE A PLURALITY OF PEAK SHAPE PARAMETERS FOR THE COMPOUND USING THE NUMERICAL VECTOR AND A MACHINE TRAINED MODEL USING THE PROCESSOR — 460

IDENTIFY A PEAK OF THE XIC AS A PEAK OF THE COMPOUND USING THE PLURALITY OF PEAK SHAPE PARAMETERS AND OPTIONALLY A PEAK INTEGRATION ALGORITHM USING THE PROCESSOR — 470

END

AUTOMATED MODELING OF LC PEAK SHAPE

RELATED US APPLICATIONS

This application claims the benefit of priority from U.S. Provisional Application No. 63/088,387, filed on Oct. 6, 2020, the entire contents of which is incorporated by reference herein.

INTRODUCTION

The teachings herein relate to operating a separation device or a sample introduction device and mass spectrometer to identify a compound of interest. More specifically, systems and methods are provided to identify or identify and integrate a chromatographic peak of a compound of interest using a notation form of the chemical structure of the compound of interest. The peak is identified or identified and integrated using a peak shape of the compound of interest calculated from a machine trained model using the notation form of the chemical structure of the compound of interest.

The system and methods disclosed herein can be performed in conjunction with a processor, controller, microcontroller, or computer system, such as the computer system of FIG. 1.

LC-MS Peak Integration

Liquid chromatography (LC) is a well-known technique used to separate and analyze compounds from a sample mixture. LC is often coupled with mass spectrometry (LC-MS) or tandem mass spectrometry (LC-MS/MS). As described below, the series of mass spectra produced from LC-MS or LC-MS/MS over time form a chromatogram. A chromatogram produced for a compound of interest is referred to as an extracted ion chromatogram (XIC), for example.

Chromatograms and XICs include one or more chromatographic peaks. These peaks are intensity versus retention time points, where the retention time refers to the time of separation from the LC. LC-MS or LC-MS/MS peaks are used to identify or quantify the compounds in the sample mixture. Compounds are quantified or quantitated by calculating the area of a peak. This calculation of the area of a peak is often referred to as peak integration.

Peak integration is generally performed algorithmically on modern mass spectrometers. There are two main types of peak integration algorithms. The first type of algorithm attempts to integrate peaks without any specific information about a compound of interest. This type of algorithm receives a chromatogram or XIC with a few parameters selected by a user and attempts to find and integrate all of the peaks or just one peak of interest in the chromatogram or XIC.

The second type of algorithm attempts to integrate peaks based on an actual peak shape of a compound of interest. The peak shape for the compound of interest is obtained from an experimental standard, for example. This actual peak shape is provided to the peak integration algorithm by a user. The algorithm then creates a mathematical peak shape model based on the actual peak shape. When this algorithm receives a chromatogram or XIC, it finds and integrates only those peaks matching the compound of interest. In other words, the second type of algorithm is more selective and accurate than the first type.

An exemplary peak integration algorithm that uses an actual peak shape of a compound of interest is AUTO-PEAK™ from SCIEX® of Framingham, MA. This algorithm creates a mathematical peak model using three Gaussian peaks, for example. The three Gaussian peak model is constructed from an actual peak shape obtained from an experimental standard and provided by a user.

Algorithms of the second type, like AUTOPEAK™, generally are able to integrate peaks more accurately and with fewer input parameters than algorithms of the first type, which integrate peaks without any specific information about a compound of interest. Unfortunately, however, the greatest drawback to algorithms of the second type that include specific information about a compound of interest is their dependency on an actual peak shape obtained for the compound of interest from an experimental standard.

As a result, additional systems and methods are needed to automatically generate a mathematical peak model for a peak integration algorithm that includes specific information about a compound of interest without having to experimentally measure an actual peak shape for the compound of interest using an experimental standard.

Mass Spectrometry Background

As described above, mass spectrometers are often coupled with separation devices, such as chromatography devices, or sample introduction devices, such as an ADE device and OPI, in order to identify and characterize compounds of interest from a sample or to analyze multiple samples. In such a coupled system, the eluting or injected solvent is ionized and a series of mass spectra are obtained from the eluting solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in a sample, for example. More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number of transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all the precursor ions in each precursor ion mass selection window are fragmented, and all of the product ions of all of the precursor ions in each mass selection window are mass analyzed.

SUMMARY

A system, method, and computer program product are disclosed for identifying a chromatographic peak of a compound of interest using the chemical structure of the compound of interest provided in notation form. The system includes a separation device or sample introduction device, an ion source device, a mass spectrometer, and a processor.

The separation device or sample introduction device separates or introduces a compound of interest from a sample containing unknown components at a plurality of different times. The ion source device ionizes the compound, producing an ion beam. The mass spectrometer selects and mass analyzes the compound or selects, fragments, and mass analyzes fragments of the compound from the ion beam at the plurality of different times. A plurality of mass spectra is produced for the compound.

The processor determines or calculates an XIC for the compound using the plurality of mass spectra received from the mass spectrometer. The processor converts a chemical structure of the compound received in notation form to a numerical vector using a processing algorithm operable to convert the notation form to the numerical vector. In some embodiments notation form is a line notation and the processing algorithm is a natural language to numerical vector processing algorithm. The processor calculates a plurality of peak shape parameters for the compound using the numerical vector and a machine trained model. The processor identifies a peak of the XIC as a peak of the compound using the plurality of peak shape parameters. This can then be utilized to determine a peak integration algorithm.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

FIG. 4 is a flowchart showing a method for identifying a chromatographic peak of a compound of interest using the chemical structure of the compound of interest provided in notation form, in accordance with various embodiments.

Figure 1:
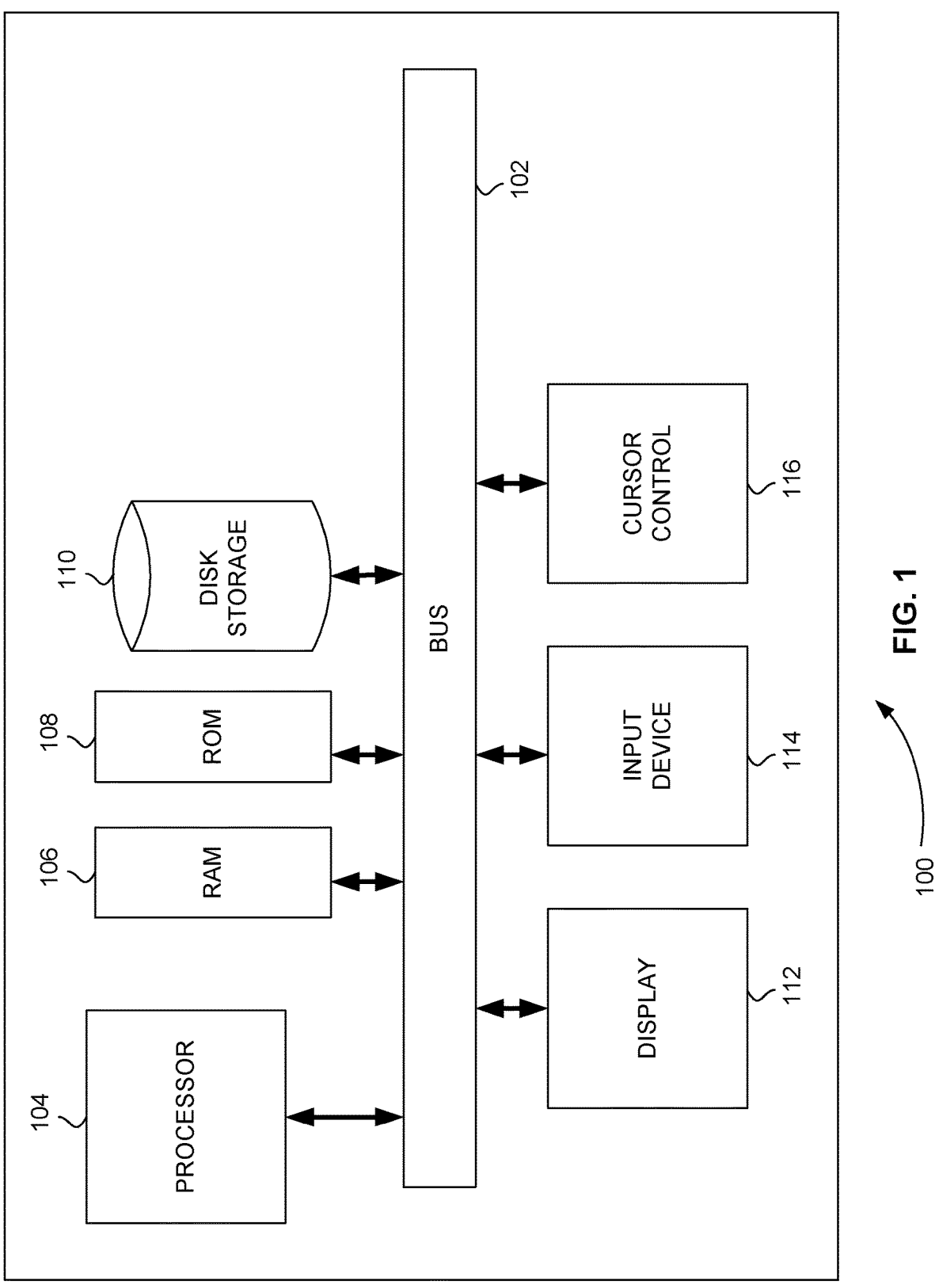
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Peak Shape Model from Notation Form of Chemical Structure

As described above, peak integration algorithms that integrate peaks based on an actual peak shape of a compound of interest are able to integrate peaks more accurately and with fewer input parameters than algorithms that integrate peaks without any specific information about a compound of interest. Unfortunately, however, the greatest drawback to algorithms that include specific information about a compound of interest is their dependency on an actual peak shape obtained for the compound of interest.

As a result, additional systems and methods are needed to automatically generate a mathematical peak model for a peak integration algorithm that includes specific information about a compound of interest without having to experimentally measure an actual peak shape for the compound of interest using an experimental standard.

In various embodiments, a machine learning model for chromatographic peak shape is generated or trained using a number of inputs to create a machine trained model. First, actual peak shapes for a large number of compounds of interest are provided as inputs to a machine learning training algorithm. The actual peak shapes are obtained by mass analyzing, using MS or MS/MS, a large number of standard samples of the compounds of interest that are separated over time using at least one separation system.

Second, the chemical structure of each of the compounds of interest is provided to a machine learning training algorithm using a notation form which is representative of the chemical structure. One such notation form is a line notation. The line notation can include, but is not limited to, the simplified molecular-input line-entry system (SMILES) notation, the SYBL line notation (SLN), or the international chemical identifier (InChi) notation. The line notation of each compound of interest is then transformed by a natural language to numerical vector algorithm to a numerical vector. The numerical vector of each of the compounds of interest is then the input used by the machine learning training algorithm. The natural language processor can include, but is not limited to, the word2vec algorithm, doc2vec algorithm, or global vectors for word representation (GloVe) algorithm. In various embodiments, the notation form can be in the form of a binary representation of the chemical structure that is transformed utilizing a processing algorithm operable to convert the notation form as exemplified by the binary representation to the numerical vector.

In various embodiments, a third optional input for the machine learning training algorithm is the separation system used for each actual peak shape of each compound of interest. For example, a compound of interest may be separated and mass analyzed using two or more different separation systems. In addition, separation systems may vary in a number of ways. The column media may be different, the ion pairing agents used may be different, or the solvents used may be different. As a result, separation system inputs provided to the machine learning algorithm can include at least the column media, the ion pairing agents, and the solvents used for each actual peak shape provided.

From the inputs provided, the machine learning algorithm generates a machine trained model for peak shape. This machine trained model is then used to calculate the mathematical peak shape for a compound of interest without having to obtain an actual peak shape for the compound of interest from an experimental standard. Instead, only the structure in notation form (such as line notation) of any new compound of interest is needed to generate the mathematical peak shape from the machine trained model. In this manner, the machine trained model comprises a previously generated model developed from machine learning training on a plurality of examples of peak shape parameters to numerical vector data.

In other words, once the machine learning peak shape model is trained it can be used over and over again without having to run any experimental standards. From the notation form (e.g. line notation) of the structure of a new compound of interest, the natural language processor generates numerical vectors for the new compound of interest. These numerical vectors, in turn, are provided as input to the machine trained peak model, which generates peak shape parameters or a mathematical model that can be used by the peak integration algorithm, such as AUTOPEAK™.

In general, the peak shape for each compound to be analyzed from a chromatographic perspective is defined by the interaction of the compound with the separation media in the presence of the ion pairing agent. In various embodiments, the ability to compile or define a peak model for each compound within the variable surface of different column media and ion pairing agents in the absence of having to analyze all different standard compounds improves the applicability of compound of interest dependent peak integration algorithms, such as AUTOPEAK™.

With such peak models, the peak integration algorithm is also improved in its effectiveness and provides optimal integration for all compounds and all peaks. This reduces the level of peak review and improves the quality of the results that the end-user produces. It also allows algorithms, such as AUTOPEAK™ to be used for workflows where it is not currently practical to build a tailored model using a known standard.

Chemical structure is defined through the use of various notation forms. This provides a computational method for the definition of the storage of structure without the need for a large matrix of 3D coordinates. In general, such structure notation provides a 2D structure that is suitable for the needs here. Such notation forms can be found present in a binary input file or an ASCII file. In various embodiments, the notation form can be in the form of an ASCII file that is comprised of linear strings or line notation. In various embodiments, the notation form can be in the form of a binary file that contains a previously known format that describes the chemical structure.

These notation forms are vectorizable into a numerical vector by utilizing a processing algorithm operable to convert the notation form to the numerical vector.

For example, in the case of a linear string or line notation, these linear strings are vectorizable to a linear vector by the use of common code components, such as word2vec. This base component has been used extensively to build gene anchored models and there has been some work for the use of this base method for the development of molecular property prediction. Takata et al., "predicting the acute ecotoxicity of chemical substances by machine learning using graph theory," Chemosphere, Vol. 238, January 2020, 124604, https://doi.org/10.1016/j.chemosphere.2019.124604, (hereinafter the "Takata Paper) have also used a machine learning model to predict acute ecotoxicity in which chemical structure was vectorized to 166-bit binary information.

In various embodiments, the binary or ASCII file may have been present in a compressed format in which case, the processing algorithm should include an appropriate decompression algorithm.

In various embodiments described herein, vectorization of the chemical structure is used with peak integration parameters related to peak shape. The generation of a suitable peak model can also be vectorized and related to the chemical structure. Using these as input to machine classifier models, a determination of how a compound interacts with a different mobile phase or stationary phase is computed. This generation of a base model is then used for unknown compounds, which can then be applied to peak integration.

In various embodiments, the compounds of interest can be peptides. If the mathematical model for a peptide is mostly a function of the retention time, a table of experimental models for a collection of known peptides is generated along with the retention time. For a peptide of a known sequence but an unknown peak shape, the retention time is predicted using an existing model (machine learning, etc.) or, in some cases, the retention time is already known and then the corresponding model is found from the table.

In other words, retention time is another possible input for the machine learning model. The machine learning training algorithm may determine that the peak shape of a compound of interest is dependent upon its retention time. This may be determined implicitly by learning this from the actual peak shapes of the compounds of interest that are provided. It may also be determined explicitly by receiving retention time information along with each actual peak shape or by specifying a parameter. Once it is determined, however, an expected retention time may also be required for the machine learning model used to generate the mathematical peak shape model for a new compound of interest.

System for Identifying a Compound from Notation Form Structure

Figure 2:
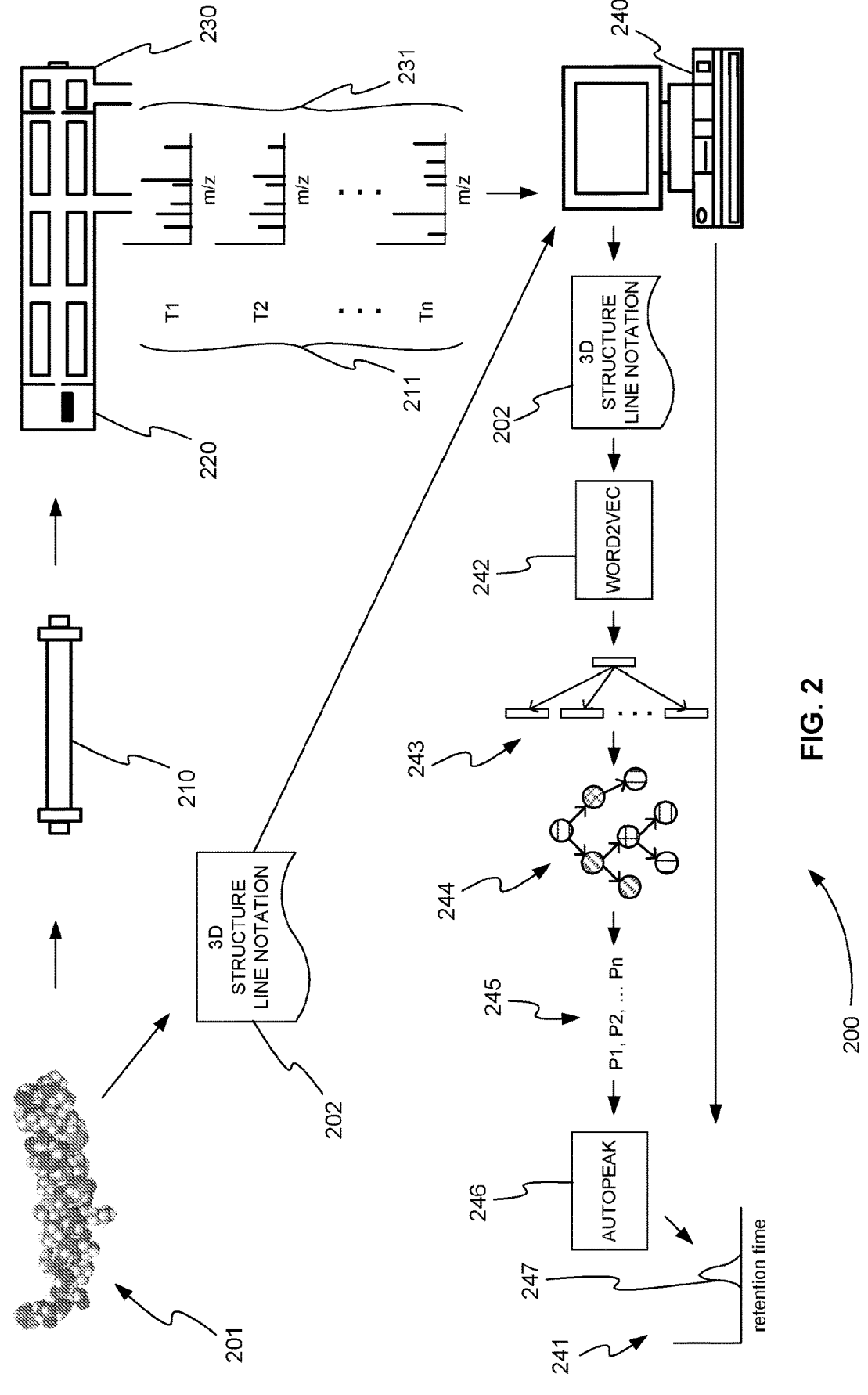
FIG. 2 is a schematic diagram of a system for identifying a chromatographic peak of a compound of interest using the chemical structure of the compound of interest provided in line notation, in accordance with various embodiments.

FIG. 2 is a schematic diagram 200 of a system for identifying a chromatographic peak of a compound of interest using the chemical structure of the compound of interest provided in line notation, in accordance with various embodiments. The system includes separation device or sample introduction device 210, ion source device 220, mass spectrometer 230, and processor 240.

Separation device or sample introduction device 210 separates or introduces compound of interest 201 from an unknown sample at plurality of different times 211. Separation device or sample introduction device 210 is controlled by processor 240, for example. Separation device or sample introduction device 210 is shown as an LC separation device. In various alternative embodiments, a separation device can perform one of a variety of separation techniques that include, but are not limited to, gas chromatography (GC) and capillary electrophoresis (CE).

Separation device or sample introduction device 210 can also be a direct sample introduction device. One exemplary method of introducing compounds of interest into a mass spectrometer without a separation device is through the use of a sample introduction device. The sample introduction device can include, but is not limited to a flow injection analysis (FIA) device or an acoustic droplet ejection (ADE) device that delivers samples rapidly to an open port interface (OPI) from individual microtiter plate wells.

Ion source device 220 ionizes compound 201, producing an ion beam. Ion source device 220 is controlled by processor 240, for example. Ion source device 220 is shown as a component of mass spectrometer 230. In various alternative embodiments, ion source device 220 is a separate device. Ion source device can be, but is not limited to, an electrospray ion source (ESI) device, a chemical ionization (CI) source device such as an atmospheric pressure chemical ionization source (APCI) device, atmospheric pressure photoionization (APPI) source device, or a matrix-assisted laser desorption source (MALDI) device.

Mass spectrometer 230 selects and mass analyzes compound 201 or selects, fragments, and mass analyzes fragments of compound 201 from the ion beam at plurality of different times 211. Plurality of mass spectra 231 are produced for compound 201. Mass spectrometer 230 is controlled by processor 240, for example.

In the system of FIG. 2, mass spectrometer 230 is shown as a triple quadrupole device. One of ordinary skill in the art can appreciate that any component of mass spectrometer 230 can include other types of mass spectrometry devices including, but not limited to, ion traps, orbitraps, time-of-flight (TOF) devices, ion mobility devices, or Fourier transform ion cyclotron resonance (FT-ICR) devices.

Processor 240 calculates XIC 241 for compound 201 using plurality of mass spectra 231 received from mass spectrometer 230. Processor 240 converts a chemical structure of compound 201 received in line notation 202 to numerical vector 243 using natural language to numerical vector processing algorithm 242. Processor 240 calculates plurality of peak shape parameters 245 for compound 201 using numerical vector 243 and machine trained/learning model 244. Processor 240 identifies peak 247 of XIC 241 as a peak of compound 201 using plurality of peak shape parameters 245 and optionally peak integration algorithm 246. Peak integration algorithm 246 is an algorithm that identifies and integrates peaks based on an actual peak shape of a compound of interest, such as AUTOPEAK™, for example.

Processor 240 can be a separate device as shown in FIG. 2 or can be a processor or controller of separation device or sample introduction device 210 or of mass spectrometer 230. Processor 240 can be, but is not limited to, a controller, a computer, a microprocessor, the computer system of FIG. 1, or any device capable of sending and receiving control signals and data and capable of analyzing data.

In various embodiments, processor 240 further integrates peak 247 using plurality of peak shape parameters 245 and peak integration algorithm 246.

In various embodiments, line notation 202 includes, but is not limited to, one of the SMILES notation, SLN, or the InChi notation.

In various embodiments, natural language to numerical vector processing algorithm 242 includes, but is not limited to, one of the word2vec algorithm, the doc2vec algorithm, or the GloVe algorithm In various embodiments, machine learning model 244 includes a lookup table, a neural network, a support vector machine (SVM) model, nearest neighbor, naïve Bayes, or a decision tree model.

In various embodiments, plurality of peak shape parameters 245 include peak shape parameters for a mathematical peak model used by peak integration algorithm 246.

In various embodiments, the mathematical peak model includes one or more Gaussian peaks.

In various embodiments, plurality of peak shape parameters 245 includes a position of each Gaussian peak of the one or more Gaussian peaks, a width of each Gaussian peak of the one or more Gaussian peaks, and relative heights of the one or more Gaussian peaks.

In various embodiments, processor 240 further calculates plurality of peak shape parameters 245 for compound 201 using one or more configuration parameters of separation device or the sample introduction device 210, numerical vector 243, and machine learning/trained model 244.

In various embodiments, the one or more configuration parameters include one or more numerical values that represent one or more of a separation device or sample introduction device type, an ion pairing agent type, or a solvent type.

In various embodiments, machine learning model 244 is trained using a plurality of different known standard samples that are analyzed for a known compound of interest using one or more separation devices or sample introduction devices and one or more mass spectrometers to create a machine trained model.

Figure 3:
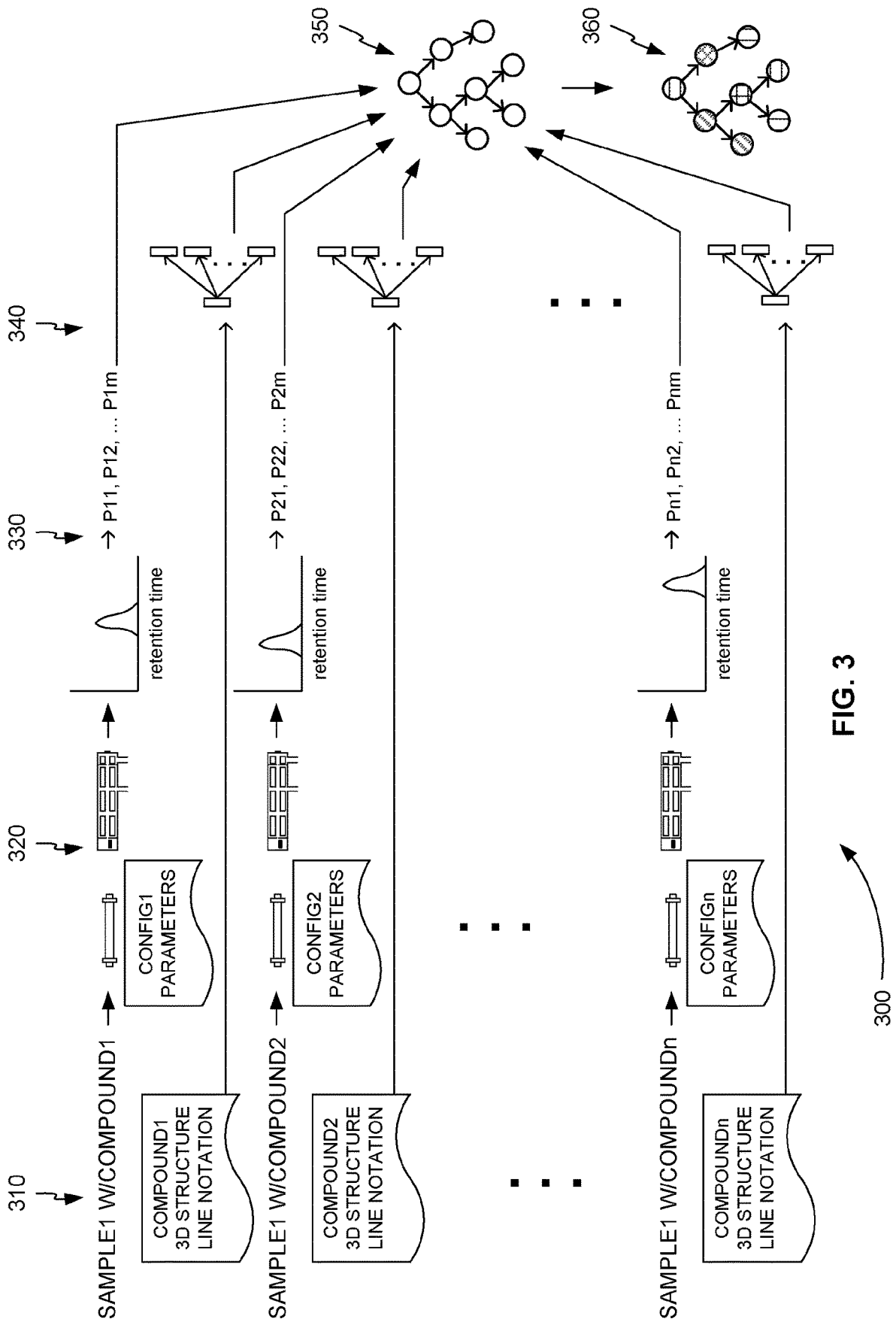
FIG. 3 is an exemplary diagram showing how a machine learning model is trained, in accordance with various embodiments.

FIG. 3 is an exemplary diagram 300 showing how a machine learning model is trained, in accordance with various embodiments. Plurality of standard samples 310 is analyzed for a known compound of interest using one or more separation devices or sample introduction devices and one or more mass spectrometers 320.

In step 330, a plurality of peak shape parameters is calculated using a peak of at least one XIC received for each known compound of the plurality of standard samples 310. A peak of at least one XIC received for each known compound of the plurality of standard samples 310 is found using peak integration algorithm 246 of FIG. 2, for example.

Returning to FIG. 3, in step 340, a chemical structure received for each known compound of the plurality of standard samples in the line notation is converted to a numerical vector. A chemical structure received for each known compound of the plurality of standard samples in the line notation is converted to a numerical vector using natural language to numerical vector processing algorithm 242 of FIG. 2, for example.

Returning to FIG. 3, in step 350 a machine learning model is trained using the plurality of peak shape parameters and the numerical vector for each known compound of plurality of standard samples 310. Trained machine learning model 360 is produced, for example. Machine trained/learning model 360 is created using a machine learning training algorithm, for example. Trained machine learning model 360 is machine learning model 244 of FIG. 2, for example.

Returning to FIG. 3, in various embodiments, one or more configuration parameters used by a separation device or a sample introduction system to analyze each sample of plurality of standard samples 310 for a known compound is received for each known compound of plurality of standard samples 310. Machine learning model 360 is then trained using the one or more configuration parameters, the plurality of peak shape parameters, and the numerical vector for each known compound of plurality of standard samples 310.

Method for Identfying a Compound from Notation Form Structure

FIG. 4 is a flowchart 400 showing a method for identifying a chromatographic peak of a compound of interest using the chemical structure of the compound of interest provided in notation form, in accordance with various embodiments.

In step 410 of method 400, a compound of interest is separated or introduced from an unknown sample at a plurality of different times using a separation device or a sample introduction device.

In step 420, the compound is ionized using an ion source device, producing an ion beam.

In step 430, the compound is selected and mass analyzed or the compound is selected, fragmented, and fragments of the compound are analyzed from the ion beam at the plurality of different times using a mass spectrometer, producing a plurality of mass spectra for the compound.

In step 440, an XIC is calculated for the compound using the plurality of mass spectra received from the mass spectrometer using a processor.

In step 450, a chemical structure of the compound received in notation form is converted to a numerical vector using a processing algorithm such as for example using a natural language to numerical vector processing algorithm using the processor when a line notation is utilized.

In step 460, a plurality of peak shape parameters is calculated for the compound using the numerical vector and a machine trained/learning model using the processor.

In step 470, a peak of the XIC is identified as a peak of the compound using the plurality of peak shape parameters and optionally a peak integration algorithm using the processor.

Computer Program Product for Identifying a Compound from Notation Form Structure In various embodiments, computer program products include a tangible computer-readable storage medium whose contents include a program with instructions being executed on a processor so as to perform a method for identifying a chromatographic peak of a compound of interest using the chemical structure of the compound of interest provided in line notation. This method is performed by a system that includes one or more distinct software modules.

Figure 5:
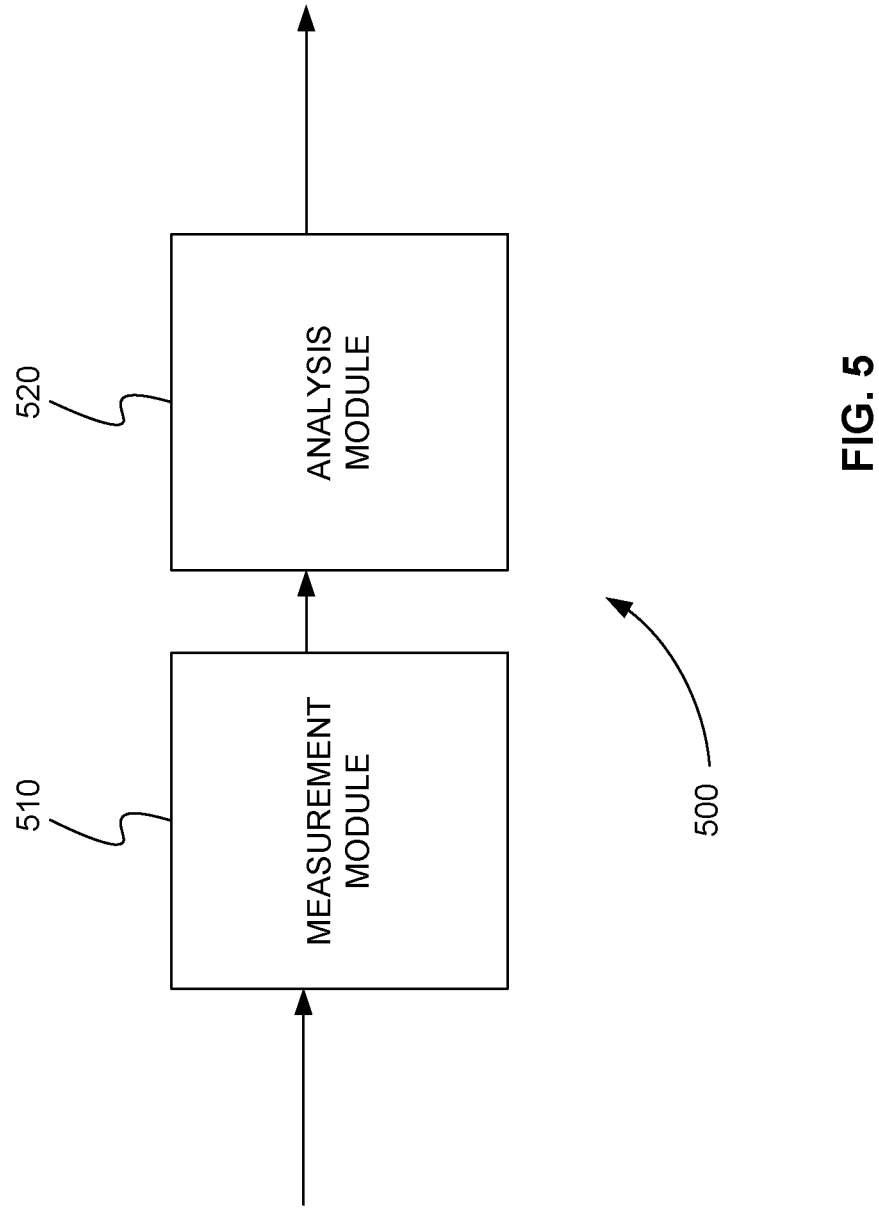
FIG. 5 is a schematic diagram of a system that includes one or more distinct software modules that perform a method for identifying a chromatographic peak of a compound of interest using the chemical structure of the compound of interest provided in notation form, in accordance with various embodiments.

FIG. 5 is a schematic diagram of a system 500 that includes one or more distinct software modules that perform a method for identifying a chromatographic peak of a compound of interest using the chemical structure of the compound of interest provided in notation form (eg. line notation), in accordance with various embodiments. System 500 includes a measurement module 510 and an analysis module 520.

Measurement module 510 instructs a separation device or a sample introduction device to separate or introduce a compound of interest from an unknown sample at a plurality of different times. Measurement module 510 instructs an ion source device to ionize the compound, producing an ion beam. Measurement module 510 instructs a mass spectrometer to select and mass analyze the compound or select, fragment, and mass analyze fragments of the compound from the ion beam at the plurality of different times, producing a plurality of mass spectra for the compound.

Analysis module 520 determines or calculates an XIC for the compound using the plurality of mass spectra received from the mass spectrometer. Analysis module 520 converts a chemical structure of the compound received in notation form to a numerical vector using a processing algorithm, such as a natural language to numerical vector processing algorithm when an in-line notation is utilized.

Analysis module 520 calculates a plurality of peak shape parameters for the compound using the numerical vector and a machine trained model that was created using machine learning. Analysis module 520 identifies a peak of the XIC as a peak of the compound using the plurality of peak shape parameters and a peak integration algorithm.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for identifying a chromatographic peak of a compound of interest using the chemical structure of the compound of interest provided in notation form, comprising:
    a separation device or a sample introduction device that separates or introduces a compound of interest from a sample containing unknown components at a plurality of different times;
    an ion source device that ionizes the compound, producing an ion beam;
    a mass spectrometer that selects and mass analyzes the compound or selects, fragments, and mass analyzes fragments of the compound from the ion beam at the plurality of different times, producing a plurality of mass spectra for the compound; and
    a processor that determines an extracted ion chromatogram (XIC) for the compound using the plurality of mass spectra received from the mass spectrometer;
    converts a chemical structure of the compound received in notation form to a numerical vector using a processing algorithm operable to convert the notation form to the numerical vector;
    calculates a plurality of peak shape parameters for the compound using the numerical vector and a machine trained model; and
    identifies a peak of the XIC as a peak of the compound using the plurality of peak shape parameters.

2. The system of claim 1, wherein the processor further identifies the peak of the XIC as a peak of the compound using a peak integration algorithm and wherein the processor integrates the peak using the plurality of peak shape parameters and the peak integration algorithm.

3. The system of claim 1, wherein the notation form comprises a line notation that is selected from one of the simplified molecular-input line-entry system (SMILES) notation, the SYBL line notation (SLN), and the international chemical identifier (InChi) notation.

4. The system of claim 3, wherein the processing algorithm operable to convert the notation form to the numerical vector comprises a natural language to numerical vector processing algorithm.

5. The system of claim 4, wherein the natural language to numerical vector processing algorithm comprises one of the word2vec algorithm, the doc2vec algorithm, or the global vectors for word representation (GloVe) algorithm.

6. The system of claim 1, wherein the machine trained model comprises a previously generated model developed from machine learning training on a plurality of examples of peak shape parameters to numerical vector data.

7. The system of claim 6, wherein the previously generated model utilized a lookup table, a neural network, a support vector machine (SVM) model, or a decision tree model.

8. The system of claim 2, wherein the plurality of peak shape parameters comprises peak shape parameters for a mathematical peak model used by the peak integration algorithm.

9. The system of claim 8, wherein the mathematical peak model comprises one or more Gaussian peaks.

10. The system of claim 9, wherein the plurality of peak shape parameters comprises a position of each Gaussian peak of the one or more Gaussian peaks, a width of each Gaussian peak of the one or more Gaussian peaks, and relative heights of the one or more Gaussian peaks.

11. The system of claim 1, wherein the processor further calculates the plurality of peak shape parameters for the compound using one or more configuration parameters of the separation device or the sample introduction device, the numerical vector, and the machine trained model.

12. The system of claim 11, wherein the one or more configuration parameters comprise one or more numerical values that represent one or more of a separation device or sample introduction device type, an ion pairing agent type, or a solvent type.

13. The system of claim 1, wherein the processor further calculates the plurality of peak shape parameters for the compound using an expected retention time received for the compound, the numerical vector, and the machine trained model.

14. The system of claim 1, wherein the machine trained model is trained using a plurality of different known standard samples that are analyzed for a known compound of interest using one or more separation devices or sample introduction devices and one or more mass spectrometers by calculating a plurality of peak shape parameters using a peak of at least one XIC received for each known compound of the plurality of standard samples;
    converting a chemical structure received for each known compound of the plurality of standard samples in the notation form to a numerical vector using the processing algorithm operable to convert the notation form to the numerical vector; and
    creating the machine trained model by utilizing machine learning using the plurality of peak shape parameters and the numerical vector for each known compound of the plurality of standard samples.

15. The system of claim 14, wherein one or more configuration parameters used by a separation device or a sample introduction device to analyze each sample of the plurality of standard samples for a known compound is received for each known compound of the plurality of standard samples and wherein the machine trained model is created by machine learning using the one or more configuration parameters, the plurality of peak shape parameters, and the numerical vector for each known compound of the plurality of standard samples.

16. A method for identifying a chromatographic peak of a compound of interest using the chemical structure of the compound of interest provided in notation form, comprising:
    separating or introducing a compound of interest from an unknown sample at a plurality of different times using a separation device or a sample introduction device;
    ionizing the compound using an ion source device, producing an ion beam;
    selecting and mass analyzing the compound or selecting, fragmenting, and mass analyzing fragments of the compound from the ion beam at the plurality of different times using a mass spectrometer, producing a plurality of mass spectra for the compound;

determining an extracted ion chromatogram (XIC) for the compound using the plurality of mass spectra received from the mass spectrometer using a processor;

converting a chemical structure of the compound received in notation form to a numerical vector using a processing algorithm operable to convert the notation form to a numerical vector using the processor;

calculating a plurality of peak shape parameters for the compound using the numerical vector and a machine trainer model using the processor; and identifying a peak of the XIC as a peak of the compound using the plurality of peak shape parameters using the processor.

17. The method of claim 16, further comprising wherein the identifying a peak of the XIC as a peak of the compound also uses a peak integration algorithm using the processor.

18. A computer program product, comprising a non-transitory and tangible computer-readable storage medium whose contents include a program with instructions being executed on a processor to perform a method for identifying a chromatographic peak of a compound of interest using the chemical structure of the compound of interest provided in notation form, the method comprising:

providing a system, wherein the system comprises one or more distinct software modules, and wherein the distinct software modules comprise a measurement module and an analysis module;

instructing a separation device or a sample introduction device to separate or introduce a compound of interest from an unknown sample at a plurality of different times using the measurement module;

instructing an ion source device to ionize the compound using the measurement module, producing an ion beam;

instructing a mass spectrometer to select and mass analyze the compound or select, fragment, and mass analyze fragments of the compound from the ion beam at the plurality of different times using the measurement module, producing a plurality of mass spectra for the compound;

calculating an extracted ion chromatogram (XIC) for the compound using the plurality of mass spectra received from the mass spectrometer using the analysis module;

converting a chemical structure of the compound received in notation form to a numerical vector using processing algorithm operable to convert the notation form to numerical vector using the analysis module;

calculating a plurality of peak shape parameters for the compound using the numerical vector and a machine trained model using the analysis module; and identifying a peak of the XIC as a peak of the compound using the plurality of peak shape parameters.

19. The computer program product of claim 18 wherein the method further comprises identifying a peak of the XIC as a peak of the compound using a peak integration algorithm using the analysis module.

* * * * *